UNITED STATES PATENT OFFICE.

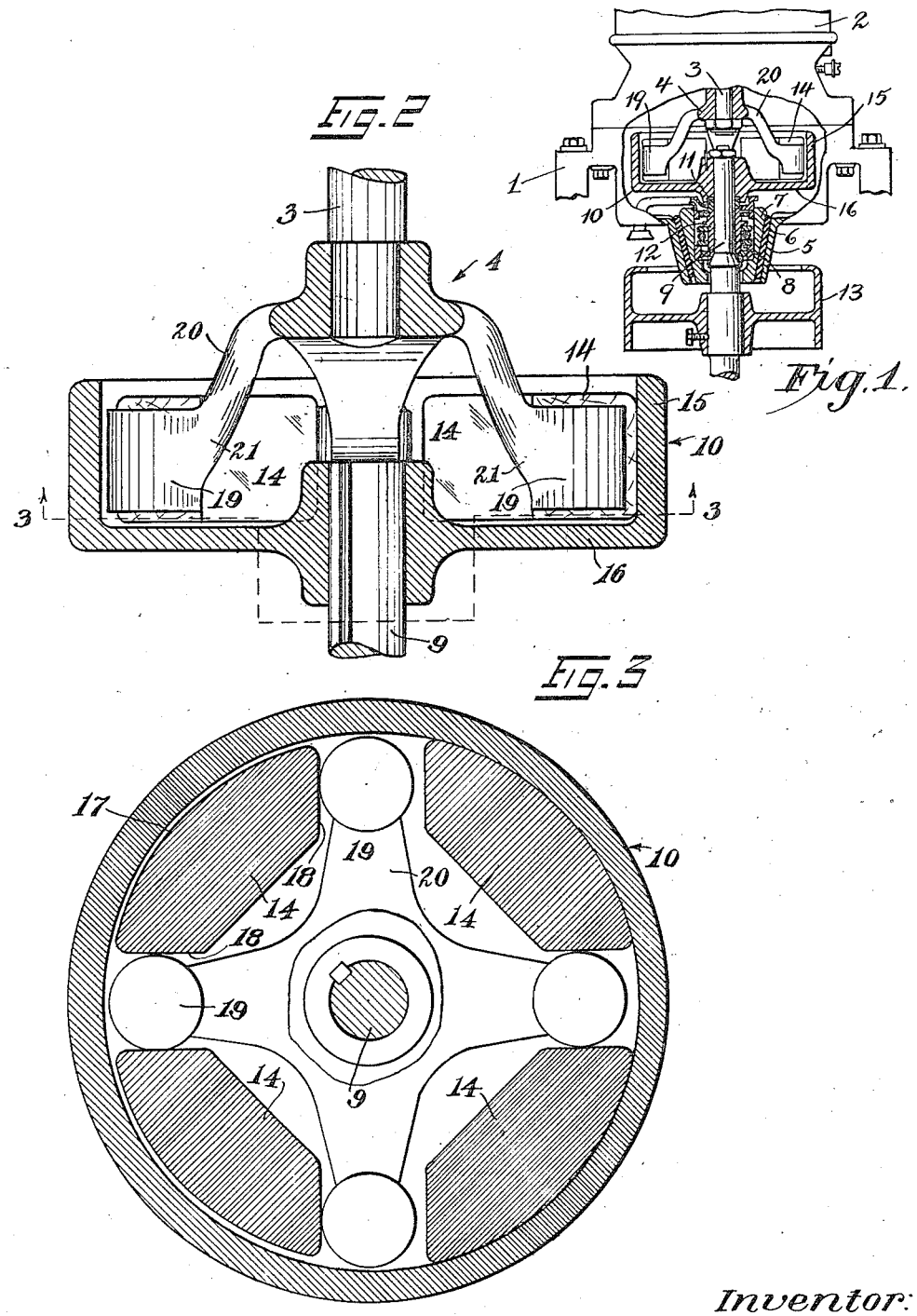

ANDREW ROBERT ROBERTSON, OF GLASGOW, SCOTLAND.

FRICTION-CLUTCH.

1,265,816.

Specification of Letters Patent.

Patented May 14, 1918.

Application filed June 12, 1915. Serial No. 33,662.

*To all whom it may concern:*

Be it known that I, ANDREW ROBERT ROBERTSON, a subject of the King of Great Britain and Ireland, residing in Glasgow, Scotland, have invented certain new and useful Improvements in Friction-Clutches, of which the following is a specification.

This invention relates to the general class of friction clutches and more particularly to clutches for connecting a motor shaft to a driven shaft.

One of the main objects of the invention is to provide a clutch which is highly flexible whereby to take up or absorb the vibrations which tend to return to the motor with its consequent injurious effects.

Still another object of the invention is to provide such a clutch whereby the angular displacement of one shaft relative to the other will be fully compensated for so that neither the efficiency of the clutch will be impaired by such angular displacement, nor the respective shafts thereby subjected to extra wear.

To this end, an arrangement of clutch is provided in which loosely mounted blocks are disposed to be actuated by a driving shaft and to be thrust into engagement, by centrifugal force, with a coupling fast on the driven shaft, thereby to flexibly tie the driving shaft with the driven shaft so that the driven shaft will be actuated by said driving shaft, in which arrangement, the blocks are so mounted that they will be subjected to the fewest possible confining forces, viz: the force to rotate them and the consequent centrifugal force.

A particular feature of the mounting of the friction blocks is their freedom in an axial or longitudinal direction by means of which the driving shaft and the driven shaft may either move from one another or approach one another in an axial direction within certain limits without in any way impairing the clutching effectiveness.

A still further object of the invention is to provide wooden friction blocks for such clutch arrangement, which blocks are light in weight, durable and easily replaced in case of wear.

These and other features, capabilities and advantages of the invention will appear from the subjoined detailed description of one specific embodiment thereof illustrated in the accompanying drawings in which—

Figure 1 shows a fragmentary view in elevation of a motor housing mounted on a stool, parts being broken away to show the vertically disposed motor spindle, the vertically disposed driven spindle, and the clutch for connecting the two.

Fig. 2 is an enlarged detail view partly in section of the clutch shown in Fig. 1.

Fig. 3 is a section on the line 3—3 of Fig. 2 looking upward and in the direction of the arrows.

In the embodiment shown in Fig. 1, there is provided a stool 1 partly broken away on which is secured the motor housing 2 in which a motor is suitably mounted, the vertically disposed motor spindle or driving shaft 3 being shown as equipped with a block engaging member 4 fastened to the lower end of said shaft 3.

The stool 1 is provided with a downwardly extending cone shaped bearing member 5 in which is disposed a cone-shaped flexible member or conoidal buffer 6 preferably composed of india rubber or the like, in which in turn is disposed the ball or roller bearing housing 7 containing the ball and roller bearing 8 through which extends the driven spindle or shaft 9 equipped at its upper end with a coupling 10, at the lower end of which coupling there is secured a conical bushing 11 resting in the upper end of the bushing 12 of the bearing 8. Below the bearing member 5, a brake pulley 13 is secured to the driven shaft 9.

The coupling 10 as shown in Figs. 2 and 3 is preferably a cup-shaped member in which friction blocks 14, preferably composed of wood, are loosely disposed, the annular wall 15 of the coupling extending substantially at right angles to the base 16 thereof. The blocks 14 preferably have a curved surface 17 to rest against the annular wall 15, and a plane surfaces 18 against which engage the enlarged portions 19 of the fingers 20 of the block engaging member or spindle 4. The fingers 19 are preferably bent inward toward the center of the shaft 3, as shown at 21, before extending upward, whereby the blocks 14 will be prevented from being displaced toward the center of the coupling member 10.

From the foregoing it will be seen that the driven members may remove from or approach toward the driving members of the respective clutch arrangements in an axial direction within certain predetermined limits without in any way impairing the clutching efficiency of the blocks, since when the blocks have once been locked against a driven member by frictional arrangement due to centrifugal force, they will remain so locked irrespective of the relative movement of such driven member with its driving member.

It will further be seen from Fig. 1, that, should the bearing housing 7 change its axial position due to the wear or settling of the india rubber buffer 6, or through wear of the respective parts of the connection, the consequent settling or downward displacement of the driven spindle 9 will not in any way affect the clutching efficiency of the blocks 14 since they will move down with the coupling 10 and the engagement of the fingers 20 with such blocks will, for all practical purposes, be just the same.

It is obvious that various changes and modifications may be made to the details of construction without departing from the general spirit of the invention.

I claim:

1. In a friction clutch, the combination of a driving shaft; a driven shaft; a cup-shaped member secured to the driven shaft; a block engaging member secured to the driving shaft and comprising arms each provided at its outer end with a substantially cylindrical enlargement having its axis substantially parallel to said shafts; and friction blocks each having a curved face adapted to contact the inner face of the wall of said cup-shaped member, each block being provided with beveled end faces respectively adapted to contact one of said enlargements.

2. In a friction clutch, the combination of a pair of vertical substantially alined shafts; a cup-shaped member on the lower shaft; a block engaging member on the upper shaft and provided with outwardly, downwardly and outwardly curved arms; a cylindrical enlargement having a vertical axis on the free end of each arm; friction blocks each having a curved face adapted to contact the wall of the cup-shaped member, and end faces adapted to engage said enlargements.

3. In combination with a vertically disposed driving shaft and a vertically disposed driven shaft below said driving shaft; a device of the character described comprising a cup-shaped member secured to the upper end of the driven shaft; an annular wall on said cup-shaped member, block engaging means secured to the lower end of said driving shaft; said block engaging means comprising fingers extending downwardly into said cup-shaped member at their free ends with vertically disposed cylindrical enlargements; and blocks loose and mechanically free disposed in said cup-shaped member and between said enlargements; the lower portions of said fingers being bent inwardly a sufficient distance for said enlargements to form guides for said blocks; said blocks being engaged by said enlargements and rotated thereby so as to be thrust outward by centrifugal force into engagement with the annular wall of said cup-shaped member; the fingers in their downward extent forming a space between them so that they will never act to bind the blocks against the coupling member when the driven shaft is angularly displaced relative to said driving shaft.

ANDREW ROBERT ROBERTSON.

Witnesses:
  WILFRED HUNT,
  BERTRAM HUNT.